CARBON-PARAFFIN COMPOSITION ELECTRODE (30-60% CARBON)
(70-40% PARAFFIN)

3,459,652
PARAFFIN-ACTIVE CARBON ELECTRODE
Donald H. Grangaard, Appleton, Wis., assignor to Kimberly-Clark Corporation, Neenah, Wis., a corporation of Delaware
Filed Dec. 27, 1966, Ser. No. 604,933
Int. Cl. B01k 3/08
U.S. Cl. 204—294                                         4 Claims

ABSTRACT OF THE DISCLOSURE

A porous low cost alkali stable electrode which is resistant to wetting, highly efficient for the electrolytic reduction of oxygen to perhydroxyl ion and formed by cold or hot pressing activated carbon having paraffin intimately adsorbed thereon.

BACKGROUND OF THE INVENTION

Field of the invention

This invention relates to electrodes and to improvements in the art of the production of solutions of certain oxygen-containing compounds having utility, for example, in the bleaching field; the invention is particularly concerned with the preparation of a new and economical though highly efficient electrode useful in the production of such oxygen-containing compounds by electrochemical procedures.

Description of the prior art

The production of solutions of hydrogen peroxide, and other oxygen-containing compounds, involving the use of a cathode electrode prepared by coating a graphite or suitable base material with active carbon as the catalytic component, together with a binder, is known in the art. Such electrodes are porous and under slight pressure pass gases quite readily. Also, such electrodes have been wet proofed to some degree against electrolyte wetting by impregnation with a dilute solution of paraffin in an appropriate solvent. The impregnation with the paraffin solution may be made by dipping or coating the electrode, and the coating of paraffin so obtained is said to be sufficiently thin that the active properties of the carbon are not influenced.

I have found, however, that electrodes produced as above described are lacking in significant utility because:

(a) Such electrodes are relatively expensive to prepare;

(b) Such electrodes have a relatively short life due to the thinness of the active carbon layer since it is difficult to apply a layer of carbon of sufficient thickness to provide an electrode of relatively long life, and still maintain the required porosity;

(c) It is almost impossible to obtain good adhesion between the graphite base and the active carbon layer without, in turn, destroying the porosity, since maintaining the high degree of porosity necessary requires, in turn, the use of relatively low amounts of binder;

(d) Such electrodes wet easily in operation since it is very nearly impossible to adequately wetproof the electrode without, in turn, destroying the porosity; such electrodes thus have a relatively short life.

SUMMARY

It is an object of this invention to provide an electrode which overcomes the above-noted defects and has particular utility in the production of hydrogen peroxide, per salts and the like.

It is another object of this invention to provide a novel process for the production of an electrode and which process is characterized particularly by the provision of a powder mixture capable of being formed by either hot or cold molding procedures.

It is another object of this invention to provide an electrode which has good water-resistance, good porosity, good electrical conductivity and long operational life for the purposes of peroxide production.

Briefly, I have found that finely divided activated carbon can be mixed with relatively large amounts of paraffin (in the molten state) and then subsequently formed into a porous electrode by a hot or cold pressing operation. Such an electrode is handleable, porous to the passage of gases, non-wetting to electrolytes, and is highly efficient for the production of peroxides, in particular an alkaline solution of hydrogen peroxide. Further, such electrodes do not require additional materials, the paraffin acting both as the wet proofing agent and as the binder. Additionally, the fact that such electrodes may be cold pressed means that they can be molded into a suitable casing which may or may not be an actual part of the cell cathode compartment. The ability to be able to mold the electrodes in this manner greatly facilitates the ease of handling of the electrodes as well as greatly simplifying the assembly of the electrolytic cells.

In the practice of my process it appears to be important that the carbon be mixed with the paraffin while the paraffin is in the molten state, and the mixing continued for such a time and to such an extent that the mixture, even though it may be hot ($T = 100°$ to $150°$ C.) is in the form of a dry powder. The carbon particles introduced to the hot paraffin appear to adsorb the paraffin to such an extent that a distinct thickening action occurs which, upon the further addition of the carbon, results in a mixture which is dry and powdery in appearance.

The mixture is substantially uniform and no paraffin is visible to the unaided eye after the simple mixing operation. In general, the mixture consists largely of many fine particles. At times, however, a few relatively large, but soft, agglomerates are formed which require breakdown before use. For this reason I prefer to carry out the complete process of mixing and grinding in a heated ball mill, heated sigma blade type kneader, or the like, until a lump-free, free-flowing powder is obtained. The time of milling or grinding is relatively short as the mix pulverizes extremely readily.

The fine powder (mesh, usually about 80 to 100) constituted by a mixture of active carbon and paraffin, I have found, can be pressed readily either hot or cold into flat plates, upon subjecting an evenly distributed layer of the paraffin-carbon mixture to pressures of the order of 250 to 1000 p.s.i. The evenly distributed layer is conventionally attained by placing a fixed weight of the mixture into a cavity type mold and striking the mixture surface with a smoothing bar until the mold is evenly and uniformly filled. Alternately, an extrusion type molding procedure may be used. In either event, the pressure should be sufficient to cause adhesion of the mass so that the binding action of the paraffin will be evident. Such contributes to strength in the ultimate product.

BRIEF DESCRIPTION OF THE DRAWINGS

The invention will be more fully understood by reference to the following detailed description and accompanying drawings wherein.

DESCRIPTION OF THE PREFERRED EMBODIMENTS

Figure 1:
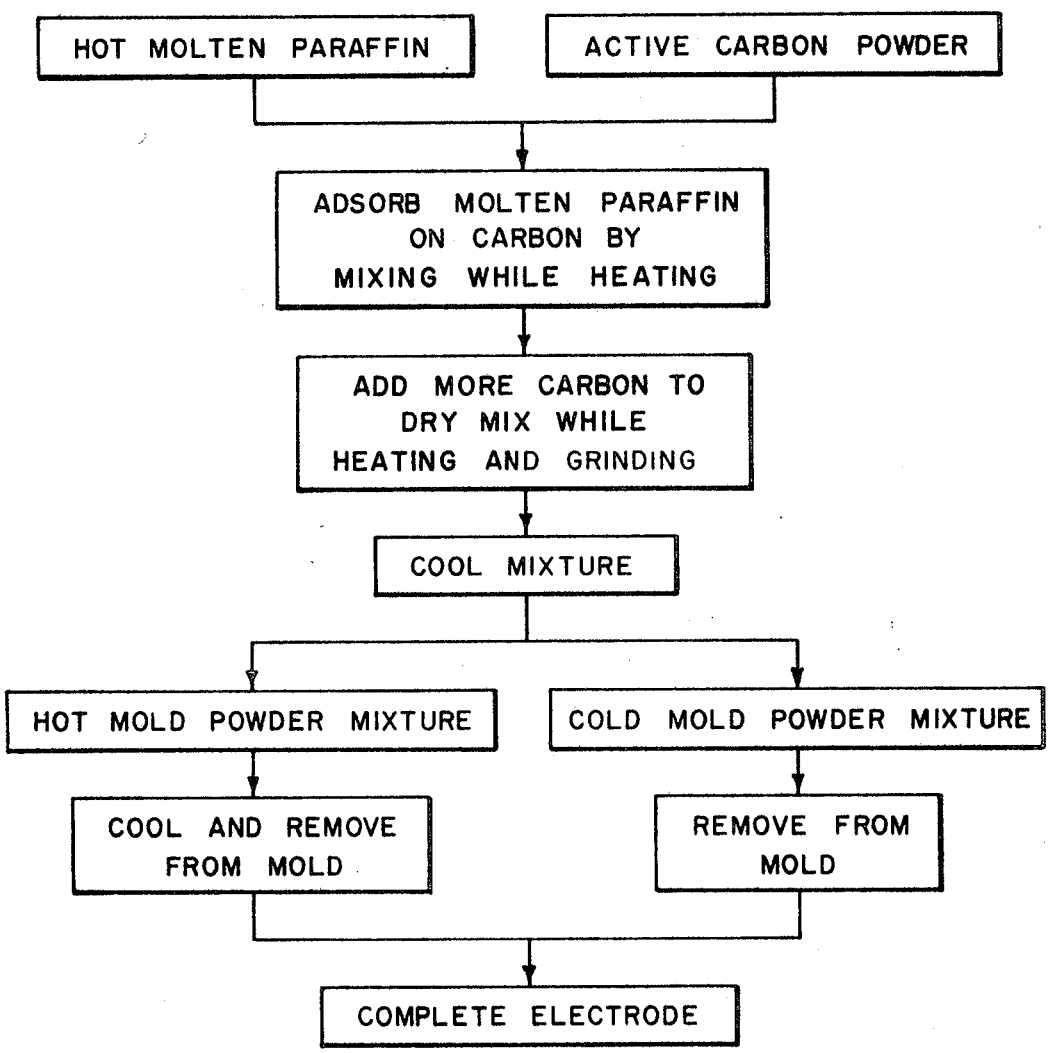
FIG. 1 is a flow sheet illustrating a preferred procedure in the practice of the invention.

In a preferred embodiment of the process (FIG. 1) of invention, the proportion of active carbon to paraffin by weight is about 1:1. The carbon by volume then considerably exceeds that of the paraffin. The specification of the mesh of the carbon is 50 to 75% through 325 mesh with 90–99% through 100 mesh. The hot molten paraffin (T=100 to 150° C.) under such circumstances becomes a generally heavy gel-like mass as active carbon (in the powder form) addition to the paraffin proceeds; the paraffin is adsorbed by the carbon and finally a dry powdering of the mass of the components takes place even though the mass is hot (T=100–150° C.). In this preferred practice a portion of the carbon is added and mixed with the molten paraffin to dryness; the remainder of the carbon is then added with heating and mixing. The mix commonly appears dry to the eye when about ⅓ to ½ of the carbon has been added in a 1:1 by weight mix. Ball mixing, kneading, or the like, of the complete mass for about 10–15 minutes results in a powder of a mesh of 80 to 100. In some instances, as the mass cools, slight lumping of the carbon-paraffin mixture occurs. The lumps which form, however, are relatively soft and are easily broken up by means of a brush type sifter or the like. By mesh I mean capable of passing readily through an 80 mesh screen but difficultly to pass through a 100 mesh screen when screened under dry conditions. Actually, the material appears to be of even finer mesh but, due apparently to the paraffin coating on the carbon particles, difficulty is experienced when trying to screen the material when using smaller meshes. This material, when pressed in a mold at a temperature of about 300–350° F., for example, will form an integral, though extremely weak, (structural) unit. To remove the unit from the mold, it is necessary to cool the mold and electrode, a step which increases the electrode strength for handling.

The characteristics of the mix are such that the electrode may also be cold molded. Although somewhat higher molding pressures are required, the saving in time through not having to cool the mold more than compensates for the increased pressure required. Actually, the cold molding operation can be carried out in much the same manner as preforms are made for commercial thermosetting molding operations.

Figure 2:
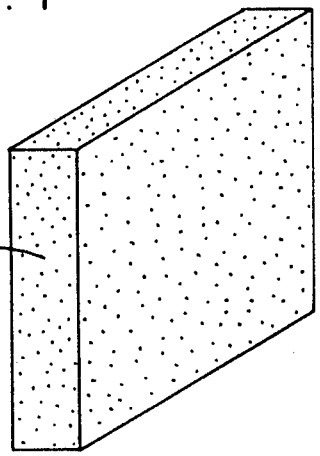
FIG. 2 is a view of an electrode with appropriate legends.

The electrodes so formed are conveniently made in planar form (FIG. 2) and may be employed in stacked relation in the electrolyzing cell apparatus. If desired, the electrode may, however, have a cylindrical configuration. The surface of the active carbon appears to be largely unaffected by the inclusion of the paraffin, as the electrode produces very nearly the theoretical amount of peroxide as defined by Faraday's laws. Further, air or oxygen readily passes through such an electrode, even though the thickness is of the order of 0.125" to 0.250".

For greater structural strength the electrode may be backed with other more rigid materials. Such preferably are electrically conductive and of a mesh-like structure. Further, the electrode may be molded into a suitable casing, said casing may or may not be a part of the actual cathode compartment.

In general, I prefer at least 50% of the electrode by weight to be active carbon. However, if desired, the electrode may consist of about 30 to about 60% carbon, or about 70 to 40% by weight of paraffin without greatly effecting the performance of the electrode. The actual ratio of carbon to paraffin used is dependent to a considerable extent upon the surface area of the carbon. The larger the surface area of the carbon, the greater the amount of paraffin which may be used. In instances where the ratio of paraffin to carbon is high, exceptional non-wetting characteristics are noted, whereas in instances where the ratio of paraffin to carbon has been lower, the electrode may for a time exhibit better performance but wets up more readily.

The carbons which I have found most useful have the following characteristics:

| | |
|---|---|
| Surface area | 500–1000 m.²/gm. |
| Fineness | 90–99% through 100 mesh; 70–90% through 200 mesh; 50–75% through 325 mesh. |
| Pore volume (cc./gm.) | 0.6–1.1. |
| Density (lbs. cu. ft.) | 9–18. |
| Iodine value | 90–96. |

The paraffins most suitably employed in the practice of the invention have the following characteristics:

| | |
|---|---|
| Tensile strength, p.s.i. Tinius Olsen 20#/sec. | 260–300 min. |
| Oil content ASTM (percent) | 0.5–0.3 max. |
| Melting point, ° F. Amp | 150–130. |

Successful results have also been obtained with substantially harder paraffins wherein the softening points have been as high as 185° F. Paraffins modified with polyethylene have also given satisfactory results. Normally the addition of added materials is not desirable unless improved strength qualities are desired.

By paraffin I mean the wax-like alkali stable substances which are produced in the petroleum industry by chilling the lubricating oil fraction when refining paraffin-base petroleum. Chemically, the material consists essentially of alkanes in the $C_{20}$–$C_{34}$ range.

Characteristics which particularly distinguish the electrodes of the invention include:

(1) Low cost.
(2) Easy fabrication.
(3) High performance.
(4) Long life.
(5) Capable of recovery and refabrication.
(6) Not necessary to add a special wet proofing agent.

Electrodes prepared as described above have been operated under the following conditions: the electrode forms the cathode of a cell having an anode of nickel wire mesh and the electrolyte is a 2% solution of NaOH. A diaphragm of asbestos between the anode and cathode separates the cell into an anolyte and catholyte compartment and the same alkali solution is directed successively through the two compartments. About 2 volts are imposed between the anode and cathode to provide a current flow of about 1.5 to 3.0 amps. Operation is at room temperature (70° F.). Air or oxygen is directed under light pressure through the cathode and the reaction takes place in known manner.

The useful life of the electrode having equal quantities by weight of paraffin and active carbon and serving as a cathode has been found to be greater than 1000 hours, even though operated on an intermittent basis without drying between cycles. In this period of 1000 hours in actual practice the electrode was dried out after about each 100 hours of operation simply by passing dry air through the electrode. During this 1000 hours an electrode of 28 sq. in. area formed about 800 grams of peroxide at an average current efficiency of about 2 kwh./lb. peroxide. It is to be noted that these figures apply to an intermittent and therefore very severe type of operation. The electrodes of the invention operate for much longer than 100 hours without re-drying when operated continuously. I consider it to be an extremely important feature of my new electrodes that they may be successfully dried out and re-used with practically their original efficiency. Commonly as a guide I prefer to subject electrodes to re-drying when the efficiency has dropped 10% as determined by the yield and/or efficiency.

It has also been found that such electrodes often after they have appeared to lose their activity can be re-activated by a simple drying operation which consists essentially of simply passing a stream of dry air through and/or over the electrode. In commercial practice, this drying operation may be carried out without disassembling the cell.

In instances where an alkaline solution of hydrogen peroxide is the desired end product, electrode cost is an extremely important factor. The cost of the electrode of this invention is low and particularly so in terms of the quantity of peroxide produced per square foot of electrode surface over the operating life of the electrode.

The term "consisting essentially of" is used herein in the definition of the components to indicate those components whose presence is essential and, as used, it is intended to exclude the presence of other materials in such amounts as to interfere substantially with the properties and characteristics possessed by the composition set forth but to permit the presence of other materials in such amounts as not substantially to affect said properties and characteristics adversely.

As many apparently widely different embodiments of this invention may be made without departing from the spirit and scope thereof, it is to be understood that I do not limit myself to the specific embodiments thereof except as defined in the appended claims.

What is claimed is:

1. An electrode adapted for use in an electrolytic process which electrode consists essentially of an electrically conductive base in thin sheet pressed form of active carbon particles and paraffin intimately mixed with and adsorbed by the carbon particles, said base in thin sheet form being resistant to wetting by aqueous alkaline solutions and porous to the passage of gases therethrough, the active carbon constituting by weight between about 30 to 60% of the electrode and the paraffin by weight constituting between about 70% to 40%.

2. An electrode according to claim 1 in which the base is a thin planar sheet.

3. An electrode according to claim 1 in which the conductive base in thin planar sheet form is self-supporting and has a thickness of between about 0.125" and about 0.25".

4. An electrode according to claim 1 in which the base consists of about 50 parts by weight of active carbon and 50 parts by weight of paraffin per 100 parts by weight of base.

References Cited

UNITED STATES PATENTS

| | | | |
|---|---|---|---|
| 3,252,839 | 5/1966 | Langer et al. | 204—294 XR |
| 3,282,738 | 11/1966 | Langer et al. | |
| 3,297,485 | 1/1967 | Niedrach | 136—86 |
| 3,345,283 | 10/1967 | Shibata et al. | 204—294 |

FOREIGN PATENTS 715,159  8/1965  Canada.

JOHN H. MACK, Primary Examiner

D. R. JORDAN, Assistant Examiner

U.S. Cl. X.R.

136—121; 252—444